United States Patent [19]
Lallier

[11] Patent Number: 5,224,803
[45] Date of Patent: Jul. 6, 1993

[54] ROUTER DEVICE

[76] Inventor: Guy Lallier, 3837 Coco Plum Cir., Karanda Village 3, Pompano Beach, Fla. 33063

[21] Appl. No.: 784,315

[22] Filed: Oct. 28, 1991

[51] Int. Cl.⁵ .................. B23C 9/00; B23B 47/14
[52] U.S. Cl. ..................... 409/131; 30/500; 81/57.11; 408/20; 409/181
[58] Field of Search ............... 409/131, 144, 182, 181; 81/57.11; 7/158; 408/20, 21, 26, 22; 144/35 A, 1 F, 134 D, 134 R; 74/421 R, 421 A, 413; 29/26 B; 30/500

[56] References Cited

U.S. PATENT DOCUMENTS

| | | | |
|---|---|---|---|
| 1,366,680 | 1/1921 | Scott | 408/20 |
| 1,386,085 | 8/1921 | Albertson | 29/26 B |
| 1,815,032 | 7/1931 | Boughton | 81/57.11 |
| 1,990,991 | 2/1935 | Heubach | 409/182 |
| 2,302,853 | 11/1942 | Gordon | 81/57.11 |
| 2,349,156 | 5/1944 | Fischer | 74/421 A |
| 2,721,502 | 10/1955 | Adams | 409/182 |
| 3,096,798 | 7/1963 | Pugsley | 144/134 R |
| 4,082,475 | 4/1978 | Kuder | 30/500 X |
| 4,924,578 | 5/1990 | Chagnon et al. | 30/500 |

FOREIGN PATENT DOCUMENTS 2413525 10/1975 Fed. Rep. of Germany ........ 408/20

*Primary Examiner*—William Briggs
*Attorney, Agent, or Firm*—Fishman, Dionne & Cantor

[57] ABSTRACT

A router attachment for adapting a conventional screw gun for cutting sheets of drywall material includes a housing that is removably securable to the housing of the screw gun, an input shaft rotatably mounted in the housing for coupling with the screwdriver shaft of the screw gun, an output shaft rotatably mounted in the housing for coupling with a router bit and a step-up gear assembly for associating the input and output shafts so that rotation of the input shaft at a first rate of rotation drives rotation of the output shaft at a second, higher rate of rotation.

26 Claims, 4 Drawing Sheets

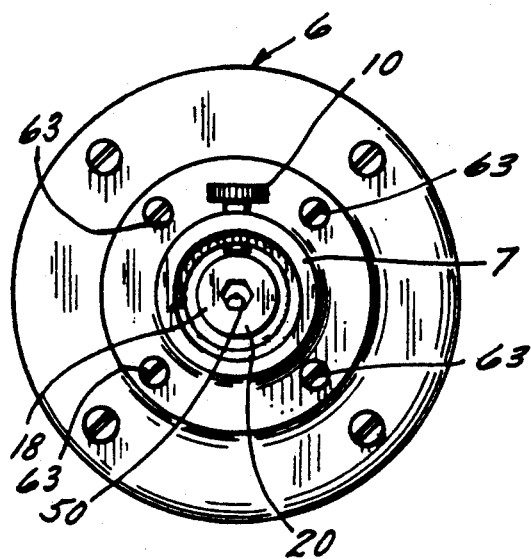
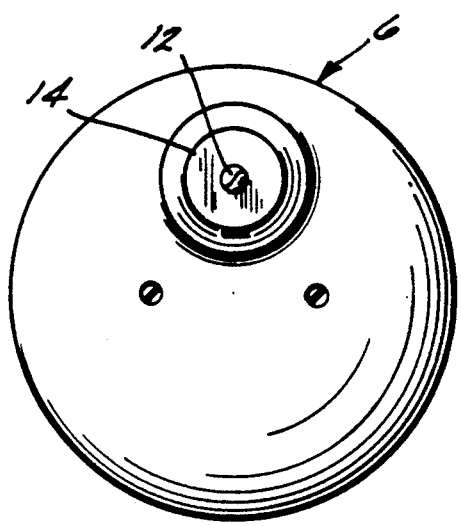
FIG. 4        FIG. 5
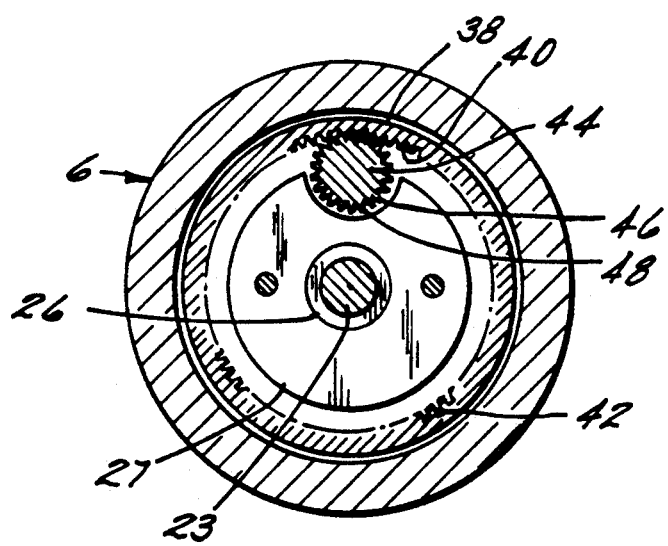
FIG. 6

ROUTER DEVICE

BACKGROUND OF THE INVENTION

A popular form of construction of interior walls and partitions includes a metallic or wooden structural framing covered on at least one side by sheets of drywall material, i.e. gypsum board. The sheets of drywall material are available in standard sizes, e.g. 4'×8'×½", and are cut to size in the field and secured to the structural framing using, e.g. screws. The cutting-to-size operation involves both trimming the edges of the boards and providing cut out areas through the boards to provide access to fittings, e.g. electrical boxes, mounted on the structural framing.

The speed, efficiency and quality of drywall installation are factors of paramount importance to dry wall contractors. In order to meet these demands the state of the art of drywall tools and installation techniques have evolved from a manual nailing procedure to installation of screws with a screw gun, i.e. a hand held device having a screwdriver tip driven by a variable speed electric motor, and from cutting sheets of drywall to size with a razor knife or saw to cutting sheets of drywall to size with a drywall router, i.e. a hand held device having a router bit driven by an electric motor.

There is a constant effort in this art to further increase the productivity of drywall installations and tools which offer even slight advantage with regard to time and labor savings are warmly received by the industry.

SUMMARY OF THE INVENTION

A router attachment device for a rotary output device is disclosed. The router attachment includes a router attachment housing means for removably attaching the router attachment to the rotary output device housing, input means, rotatably mounted in the router attachment housing, for coupling with output means on said rotary device, output means, rotatably mounted in the router attachment housing, for coupling the router attachment to the router bit and step-up means for operatively associating the input means and the output means so that rotation of the input means relative to the router attachment housing at a first rate of rotation drives rotation of the output means at a second rate of rotation, wherein the second rate of rotation is higher than the first rate of rotation.

In a preferred embodiment, the rotary output device is a screw gun and router attachment device is for adapting the screw gun for cutting sheets of drywall material. The input means of the attachment device couples with the rotary output screw driver tip of the screw gun.

Use of the router attachment of the present invention allows more efficient installation of sheets of wallboard material. A workman can easily carry both a screw gun and the lightweight router attachment and quickly attach or detach the router attachment to the screw gun as needed, as opposed to switching back and forth between the screw gun and separate conventional router. The router attachment is more easily carried, e.g. in a pouch or holder on the workman's belt, than is the heavier and more cumbersome conventional router. Furthermore, use of the router attachment of the present invention eliminates the need to maintain electrical connections between a power source and two separate motorized tools and the elimination of one of the associated electrical cords provides, safer and less cluttered workplace.

In a preferred embodiment, the input means comprises an input shaft extending axially from a first end to a second end and means for coupling the first end of the input shaft with the screwdriver tip of the screw gun. The output means comprises an output shaft extending axially from a first end to a second end and means for mounting a router bit on the second end of the output shaft for rotation therewith. The step-up means comprises an outer gear concentrically mounted on the second end of the input shaft and having inner and outer diametral surfaces, wherein a plurality of circumferentially spaced apart first gear teeth are defined in the inner circumferential surface. The step-up means further comprises an inner gear concentrically mounted in the first end of the output shaft and having an outer diametral surface wherein a plurality of circumferentially spaced apart second gear teeth are defined in the outer diametral surface. The inner gear is eccentrically mounted within the outer gear so that the first gear teeth engage the second gear teeth.

BRIEF DESCRIPTION OF THE DRAWINGS

FIG. 4 shows a rear end elevational view of the router attachment of the present invention.

FIG. 5 shows a front end elevational view of the router attachment of the present invention.

FIG. 6 shows a transverse cross sectional view taken along line 6—6 of FIG. 3.

DETAILED DESCRIPTION OF THE INVENTION

Figure 1:
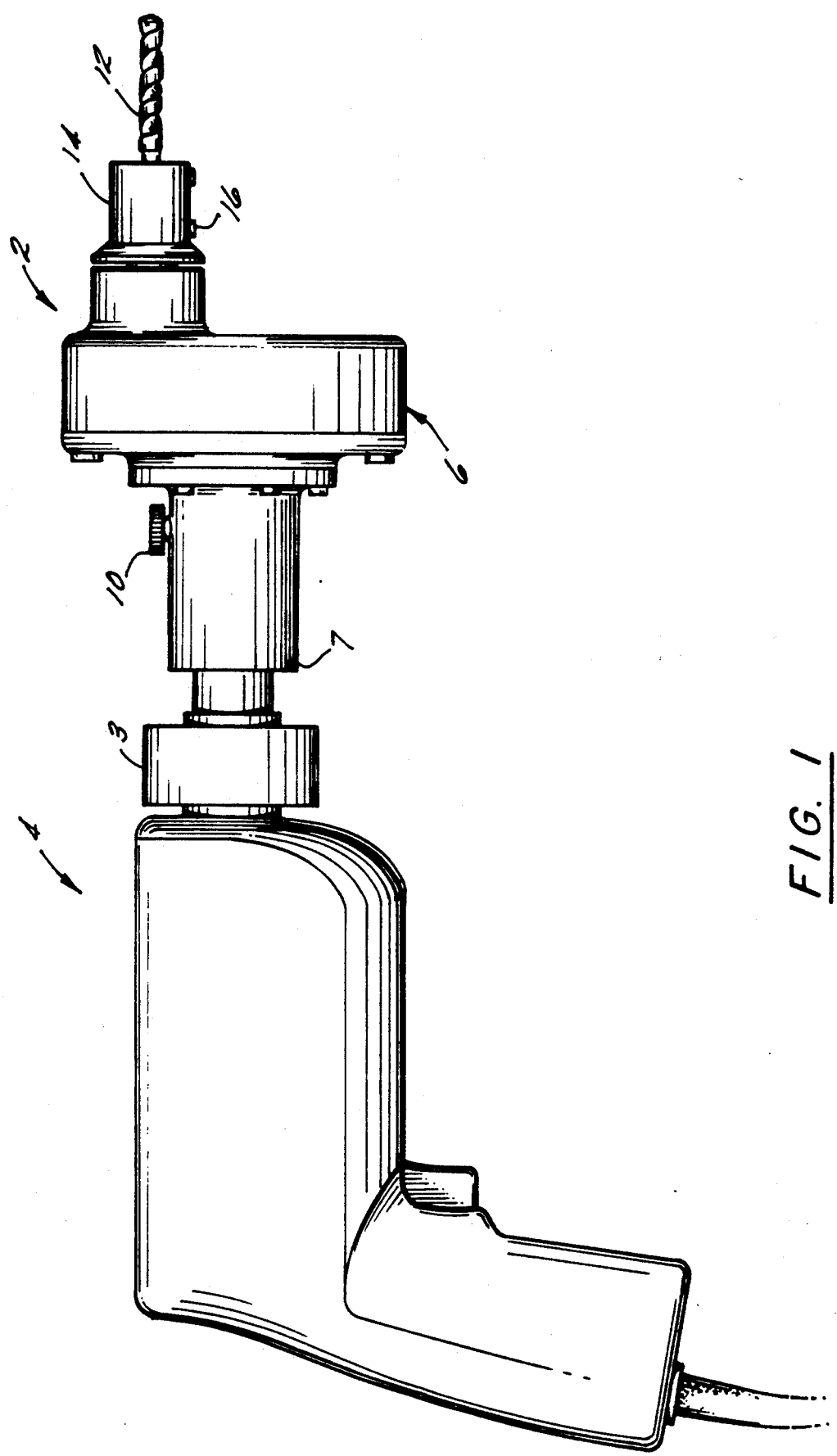
FIG. 1 shows a side elevational view of the router attachment of the present invention, mounted on a screw gun.
Figure 2:
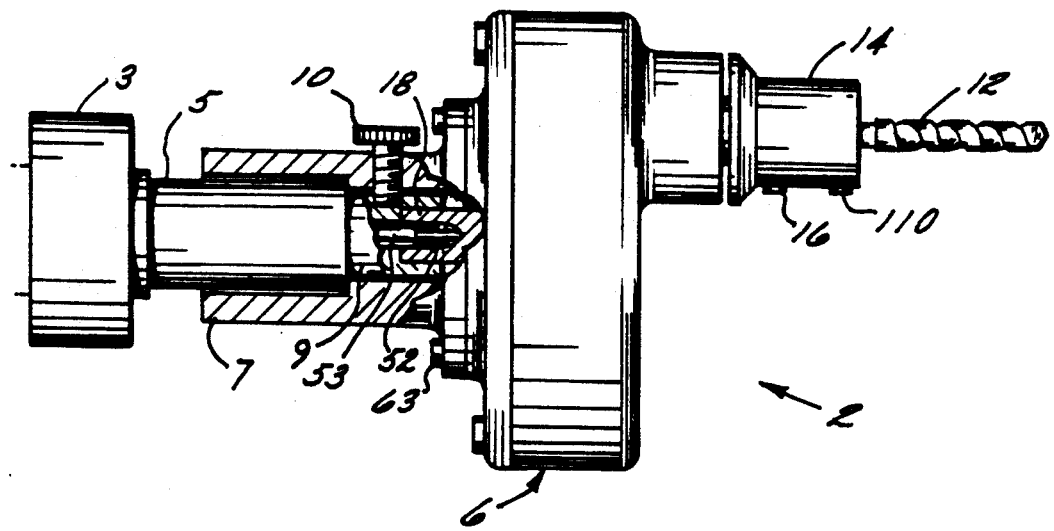
FIG. 2 shows a partially broken away side view of the router attachment of the present invention mounted on a screw gun.

Referring to FIGS. 1 and 2, which the router attachment 2 of the present invention is shown mounted on a conventional screw gun 4 with router bit 12 mounted in chuck 14 and secured by set screw 110, and to FIGS. 4 and 5, which show end views of the router attachment dismounted from a screw gun, the router attachment 2 includes a housing body portion 6 and a housing collar portion 7. The screw gun 4 includes a variable speed electric motor (not shown) and clutch mechanism (not shown) disposed within a housing 3, a tubular housing portion 5 extending axially from the housing portion 3 and a tubular collar 9 extending axially from the tubular housing portion 5. A screw driver shaft 53, having a hexagonal cross section, extends from the housing portion 3 through the tubular housing portion 5 and collar 9 to screwdriver tip 52. The screwdriver shaft 53 is operatively connected with the clutch mechanism so that the screw gun motor is decoupled from the screwdriver shaft unless the screwdriver shaft 53 is axially compressed toward the screw gun 4. Axial compression of shaft 53 toward screw gun 4, e.g. when the screw gun 4 is pressed against the head of a screw to be installed, engages the clutch mechanism and the screw gun motor is coupled with the screwdriver shaft 53 to rotate the shaft and screwdriver tip 52.

The tubular housing portion 5, collar 9, screwdriver shaft 53 and tip 52 are slidably received within collar portion 7 of the router housing 6. Screwdriver shaft 53 and tip 52 are received within and engaged with hex sprocket 50, as discussed below. The router attachment 2 is installed so that input shaft 18 contacts and compresses screwdriver shaft 53 toward the screw gun 4 thereby engaging the clutch mechanism and the router attachment 2 is then removably secured to the screw gun 4 by tightening set screw 10 against collar 9 to allow one-handed operation of the screw gun 4 and attached router attachment 2. Alternatively, the operator may operate screw gun 4 with one hand and manually secure router attachment 2 with his other hand by gripping housing 6.

Figure 7:
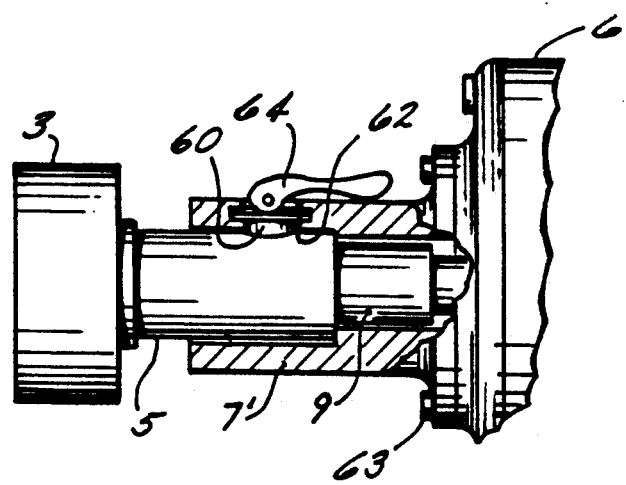
FIG. 7 shows a partially broken away side view of a portion of an alternative embodiment of the router attachment of the present invention.

Alternatively, as shown in FIG. 7, the router attachment 2 may be removably secured to the housing by a block 60 slidably mounted in a recess 62 defined within collar portion 7', and manually displaceable by quick-release cam 64, pivotably mounted on collar portion 7'. The collar portions 7, 7' are interchangeable and may be selectively secured to housing body portion 6 with screws 63. It will be appreciated that differently configured collar portions may be provided to adapt the router device 2 to fit a variety of different rotary output devices, e.g. screw guns with differently configured housings.

Figure 3:
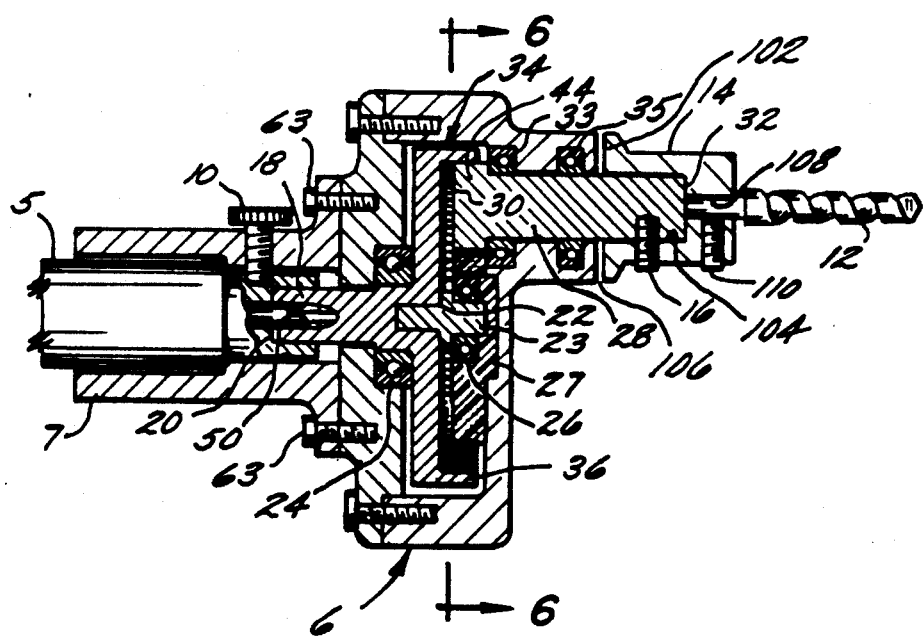
FIG. 3 shows a longitudinal cross sectional view of the router attachment of the present invention.

Referring to FIG. 3, an input shaft 18 extending from a first end 20 to a second end 22 and is extended by a concentrically mounted stub 23. The input shaft 18 and stub 23 are rotatably mounted in housing 6 by bearings 24, 26. Bearing 26 is held in place by mounting block 27. An output shaft 28 extending from a first end 30 to a second end 32 is rotatably mounted in housing 6 by high-speed bearings 33, 35. Chuck or sleeve 14 is secured to the second end 32 of output shaft 28. Chuck 14 (preferably aluminum) has a flared base 102 and has a first axial opening 104 extending from base 102. Opening 104 is slidably received over output shaft 28 and attached thereto for rotation therewith using a threadable screw 16. Sleeve 100 is positioned such that a small gap 106 is present between base 102 and housing 6. A second axial opening 108 of smaller diameter than opening 104 is coaxial with opening 104 and sized to receive a router (or drill bit) 12 (which is locked in opening 108 by a threaded screw 110). Of course, opening 108 may be sized to receive any size router or drill bit. Similarly, sleeve 14 may be interchangeable with other sleeves having differing sized openings 108.

Referring to FIGS. 3 and 6, input shaft 18 is operatively associated with output shaft 28 by gear assembly 34. Gear assembly 34 includes outer gear 36 having an outer diametral surface 38, an inner diametral surface 40 and a plurality of gear teeth 42 defined on the inner diametral surface 40. Input shaft 18 and outer gear 36 are formed in one piece with outer gear 36 being concentrically formed on the second end 22 of input shaft 18. Stub 23 is concentrically mounted in a corresponding bore to effectively extend the input shaft through gear 36. Gear assembly 34 further includes inner gear 44 having an outer diametral surface 46 and a plurality of gear teeth 48 defined on the outer diametral surface 46. Inner gear 44 is concentrically mounted on the first end 30 of output shaft 28. Output shaft 28 and inner gear 44 are mounted eccentrically, relative to input shaft 18 and outer gear 36, so that the gear teeth 42, 48 of the respective gears 36, 44 mesh.

Referring to FIGS. 2, 3, and 4, a hexagonal socket 50 is defined in the first end 20 of input shaft 18 for coupling shaft 18 with the hexagonal screwdriver shaft 53 of screw gun 4 so that rotation of the screwdriver tip shaft 53 drives rotation of input shaft 18.

The gear assembly 34 steps-up the rate of rotation of the output shaft 28 relative to the rate of revolution of the input shaft 18. Preferably, the gear assembly steps up the rate of revolution of the output shaft 28 relative to the input shaft 18 by a factor between about 2 and about 10. In the embodiment shown in FIGS. 3 and 4 the outer gear 36 has 110 gear teeth and the inner gear 44 includes 22 gear teeth, resulting in a step-up ratio of 5:1.

Typically, the variable speed motor of the screw gun allows a rate of rotation of the screwdriver tip 52 of up to about 4000 rpm. The preferred embodiment of the router attachment 2 of the present invention shown in the FIGURES would step-up the 4000 rpm rate of the screwdriver tip 52 to a rate of 20,000 rpm at the router bit 12 of the router attachment 2.

Figure 8:
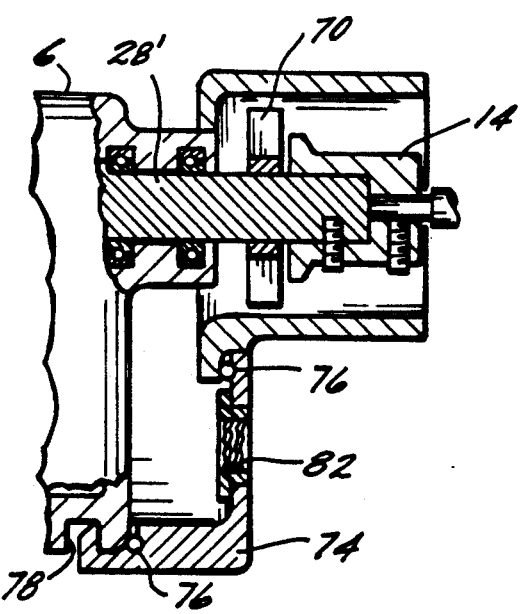
FIG. 8 shows a longitudinal cross section view of a portion of an alternative embodiment of the router attachment of the present invention.

FIG. 8 shows an alternative embodiment which provides a "vacuum cleaning" feature to the router attachment of the present invention. Fan 70 is mounted on output shaft 28' and a collar 72 extends from housing 6 to surround chuck 14. A vented (via filter 82) receptacle 74 is sealingly (by gaskets 76) snaplockedly (by recess 78 and hook 80) secured to housing 6. During use, e.g. cutting sheet of drywall, the fan 70 rotates to create a pressure differential which draws particles and debris generated by the cutting, into collar 72 and discharges the particles and debris into receptacle 74. Air is allowed to exit receptacle 74 through filter 82, while the particles and debris are retained with the receptacle for later disposal.

The housing 6, shafts 18, 28, stub 23, mounting block 27, may be made of any suitable material, e.g. metals, polymers, composite materials. In a preferred embodiment which offers the beneficial features of lower cost and lighter weight, i.e. low density, the housing 6, collar 7, shafts 18, 28, stub 23, and mounting block 36, 44 are each made of a polymer or of a particulate, e.g. glass, carbon, fluorocarbon particles or discontinuous fibers, filled polymer matrix composite material. A prototype embodiment of the device of the present invention has been machined from an acetal thermoplastic (Delrin, E. I. DuPont). Preferably, at least some of the elements of the polymer based embodiment of the present invention are made by injection molding.

To use the router attachment of the present invention, a workman removably secures the attachment to a screw gun and then operates the combined screw gun/router attachment in a manner entirely analogous to the operation of a conventional router, except that the screw gun is used as the driving force for the router bit.

Use of the router attachment 2 of the present invention allows more efficient installation of sheets of wallboard material. A workman can easily carry both a screw gun and the lightweight router attachment and quickly attach or detach the router attachment to the screw gun as needed, as opposed to switching back and forth between the screw gun and separate conventional router. The router attachment is more easily carried, e.g. in a pouch or holder on the workman's belt, than is the heavier and more cumbersome conventional router. Furthermore, use of the router attachment of the present invention eliminates the need to maintain electrical connections between a power source and two separate motorized tools and the elimination of one of the associated electrical cords provides, safer and less cluttered workplace.

While the present invention has been described by reference to a specific preferred embodiment, i.e. a router adapter for adapting a screw gun for cutting sheets of drywall material, one skilled in the art will appreciate that rotary output devices other than screw guns, e.g. a drill, may be adapted to perform cutting operations and that cutting operations other than cutting sheets of drywall, e.g. trimming sheets of countertop laminate material, may be performed using a router attachment according to the present invention by appropriate minor modifications of the embodiment shown in FIGS. 1-6.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A router attachment for a rotary output device, said rotary output device including a rotary output device housing, rotary output member rotatable relative to the housing and means for driving rotation of the rotary output member relative to the housing, comprising:

router attachment housing means for removably securing the router attachment to the rotary output device housing;

input means, rotatably mounted in the router attachment housing, for coupling with the rotary output member of the rotary output device;

output means, rotatably mounted in the router attachment housing, for coupling the router attachment with a router bit;

step-up means for operatively associating the input means and output means so that rotation of the input means at a first rate of rotation drives rotation of the output means at a second rate of rotation and the second rate of rotation is higher than the first rate of rotation;

wherein the input means comprises an input shaft extending from a first end to a second end and means for coupling the first end of the input shaft with the rotary output means;

wherein the output means comprises an output shaft extending from a first end to a second end and means for mounting a router bit on the second end of the output shaft, wherein the axis of said input and output shafts are generally parallel; and wherein said step-up means comprises, (a) an outer gear concentrically mounted on the second end of the input shaft and having inner and outer diametrical surfaces, wherein a plurality of circumferentially spaced apart first gear teeth are defined in said inner diametral surface; and (b) an inner gear concentrically mounted on the first end of the output shaft and having an outer diametral surface, wherein a plurality of circumferentially spaced apart gear teeth are defined in said outer diametral surface and wherein the inner gear is eccentrically mounted within the outer gear so that the first gear teeth engage the second gear teeth.

2. A router attachment for adapting a drywall screw gun for cutting sheets of drywall material, said drywall screw gun including a screw gun housing, a rotary output screw driver shaft, rotatable relative to the screw gun housing, and an electric motor for driving rotation of the screw driver shaft, comprising:

a router attachment housing extending from an input end, having an input opening defined therein, to an output end, having an output opening defined therein;

means for removably securing the input end of the router attachment housing to the screw gun housing;

an input shaft rotatably mounted in the router attachment housing and extending from a first end to a second end, said input opening of the router attachment housing providing access to the first end of the input shaft;

means for coupling the first end of the input shaft with the rotary output screwdriver shaft of the screw gun;

an output shaft rotatably mounted in the router attachment housing and extending from a first end to a second end, said output opening of the router attachment housing providing access to the second end of the output shaft;

step-up means for operatively associating the second end of the input shaft with the first end of the output shaft so that rotation of the input shaft at a first rate of rotation drives rotation of the output shaft at a second rate of rotation and the second rate of rotation is higher than the first rate of rotation;

means for mounting a router bit on the second end of the output shaft; and wherein the step-up means comprises;

(a) an outer gear concentrically mounted on the second end of the input shaft and having inner and outer diametrical surfaces, wherein a plurality of circumferentially spaced apart first gear teeth are defined in said inner diametral surface; and (b) an inner gear concentrically mounted on the first end of the output shaft and having an outer diametral surface, wherein a plurality of circumferentially spaced apart second gear teeth are defined in said outer diametral surface and wherein the inner gear is eccentrically mounted within the outer gear so that the first gear teeth engage the second gear teeth.

3. The router attachment of claim 2, wherein the ratio of first gear teeth to second gear teeth is between about 2:1 and about 10:1.

4. The router attachment of claim 2, wherein the ratio of the number of first gear teeth to the number of second teeth is about 5:1.

5. The router attachment of claim 1, wherein the means for mounting comprises an axially extending bore defined in the second end of the output shaft for receiving an end of the router bit and a set screw means for securing the end of the bit in the bore.

6. The router attachment of claim 1, wherein the rotary output device is a screw gun, the rotary output member is a screwdriver shaft, the means for driving rotation is an electric motor and the input means includes a socket for receiving and engaging the screwdriver shaft.

7. The router attachment of claim 1, wherein the ratio of first gear teeth to second gear teeth is between about 2:1 and about 10:1.

8. The router attachment of claim 7, wherein the ratio of the number of first gear teeth to the number of second teeth is about 5:1.

9. The router attachment of claim 1, further comprising vacuum means, operatively associated with the output means, for collecting debris generated during use of the router attachment.

10. The router attachment of claim 9, wherein the output means includes an output shaft and the vacuum means includes receptacle means, mounted on the router attachment housing, for receiving the debris and fan means, operatively associated with said output shaft, for creating a pressure differential to drive the debris into the receptacle.

11. The router attachment of claim 10 further comprising means for sealingly engaging the receptacle and the router attachment housing;
means for snaplockedly securing the receptacle to the router attachment housing; and
filter means for venting air from the receptacle while retaining debris within the receptacle.

12. A router attachment for adapting a drywall screw gun for cutting sheets of drywall material, said drywall screw gun including a screw gun housing, a rotary output screw driver shaft, rotatable relative to the screw gun housing, and an electric motor for driving rotation of the screw driver shaft, comprising:
a router attachment housing extending from an input end, having an input opening defined therein, to an output end, having an output opening defined therein;
means for removably securing the input end of the router attachment housing to the screw gun housing;
an input shaft rotatably mounted in the router attachment housing and extending from a first end to a second end, said input opening of the router attachment housing providing access to the first end of the input shaft;
means for coupling the first end of the input shaft with the rotary output screwdriver shaft of the screw gun;
an output shaft rotatably mounted in the router attachment housing and extending from a first end to a second end, said output opening of the router attachment housing providing access to the second end of the output shaft, wherein the axis of said input and output shafts are generally parallel;
step-up means for operatively associating the second end of the input shaft with the first end of the output shaft so that rotation of the input shaft at a first rate or rotation drives rotation of the output shaft at a second rate of rotation and the second rate of rotation is higher than the first rate of rotation;
means for mounting a router bit on the second end of the output shaft; and
wherein said step-up means comprises,
(a) an outer gear concentrically mounted on the second end of the input shaft and having inner and outer diametral surfaces, wherein plurality of circumferentially spaced apart first gear teeth are defined in said inner diametral surface; and
(b) an inner gear concentrically mounted on the first end of the output shaft and having an outer diametral surface, wherein a plurality of circumferentially spaced apart second gear teeth are defined in said outer diametral surface and wherein the inner gear is eccentrically mounted within the outer gear so that the first gear teeth engage the second gear teeth.

13. A router attachment for a rotary output device, said rotary output device including a rotary output device housing, rotary output member rotatable relative to the housing and means for driving rotation of the rotary output member relative to the housing, comprising:
router attachment housing means for removably securing the router attachment to the rotary output device housing;
input means, rotatably mounted in the router attachment housing, for coupling with the rotary output member of the rotary output device, said input means comprising an input shaft extending from a first end to a second end and means for coupling the first end of the input shaft with the rotary output means;
output means, rotatably mounted in the router attachment housing, for coupling the router attachment with a router bit, said output means comprising an output shaft extending from a first end to a second end and means for mounting a router bit on the second end of the output shaft; and
step-up means for operatively associating the input means and output means so that rotation of the input means at a first rate of rotation drives rotation of the output means at a second rate or rotation and the second rate of rotation is higher than the first rate of rotation, said step-up means comprising,
(a) an outer gear concentrically mounted on the second end of the input shaft and having inner and outer diametral surfaces, wherein a plurality of circumferentially spaced apart first gear teeth are defined in said inner diametral surface; and
(b) an inner gear concentrically mounted on the first end of the output shaft and having an outer diametral surface, wherein a plurality of circumferentially spaced apart second gear teeth are defined in said outer diametral surface and wherein the inner gear is eccentrically mounted within the outer gear so that the first gear teeth engage the second gear teeth.

14. The router attachment of claim 12, wherein the ratio of first gear teeth to second gear teeth is between about 2:1 and about 10:1.

15. The router attachment of claim 12, wherein the ratio of the number of first gear teeth to the number of second teeth is about 5:1.

16. A method for adapting a drywall screw gun for cutting sheets of drywall material, said drywall screw gun including a screw gun housing, a rotary output screwdriver tip rotatable relative to the screw gun housing and an electric motor for driving rotation of the screwdriver shaft, comprising:
removably securing a router attachment to the screw gun,
said router attachment comprising:
router attachment housing means for removably securing the router attachment to the screw gun housing;
input means, rotatably mounted in the router attachment housing, for coupling with the screw driver shaft of the screw gun;

output means, rotatably mounted in the router attachment housing, for coupling the router attachment with a router bit;

step-up means for operatively associating the input means and output means so that rotation of the input means at a first rate of rotation drives rotation of the output means at a second rate or rotation and the second rate of rotation is higher than the first rate of rotation; and wherein said step-up means comprises, (a) an outer gear concentrically mounted on the second end of the input shaft and having inner and outer diametral surfaces, wherein a plurality of circumferentially spaced apart first gear teeth are defined in said inner diametral surface; and (b) an inner gear concentrically mounted on the first end of the output shaft and having an outer diametral surface, wherein a plurality of circumferentially spaced apart second gear teeth are defined in said outer diametral surface and wherein the inner gear is eccentrically mounted within the outer gear so that the first gear teeth engage the second gear teeth.

17. The method of claim 16, wherein the input means comprises an input shaft extending from a first end to a second end means for coupling the first end of the input shaft with the rotary output screwdriver of the input shaft.

18. The method of claim 16, wherein the means for coupling comprises an axially extending socket for receiving and engaging the screwdriver shaft defined in the first end of the input shaft.

19. The method of claim 16, wherein the output means comprises an output shaft extending from a first end to a second end and means for mounting a router bit on the second end of the output shaft.

20. The method of claim 16, wherein the means for mounting comprises an axially extending bore defined in the second end of the output shaft for receiving an end of the router bit and a set screw means for securing the end of the bit in the bore.

21. The router attachment of claim 13, further comprising vacuum means, operatively associated with the output means, for collecting debris generated during use of the router attachment.

22. The method of claim 16, wherein the ratio of first gear teeth to second gear teeth is between about 2:1 and about 10:1.

23. The method of claim 16, wherein the ratio of the number of first gear teeth to the number of second teeth is about 5:1.

24. The router attachment of claim 13, wherein the rotary output device is a screw gun, the rotary output member is a screwdriver shaft, the means for driving rotation is an electric motor and the input means includes a socket for receiving and engaging the screwdriver shaft.

25. The router attachment of claim 13, wherein the ratio of first gear teeth to second gear teeth is between about 2:1 and about 10:1.

26. The router attachment of claim 25, wherein the ratio of the number of first gear teeth to the number of second teeth is about 5:1.

* * * * *